INVENTOR.
TJISKE DOUMA
BY J. L. Whittaker
ATTORNEY

Jan. 29, 1963 T. DOUMA 3,076,106

INDUCTIVE CIRCUITS

Filed Sept. 25, 1957 3 Sheets-Sheet 2

INVENTOR.
TJISKE DOUMA
BY J. L. Whittaker
ATTORNEY

INDUCTIVE CIRCUITS

Filed Sept. 25, 1957

INVENTOR.
TJISKE DOUMA
BY J. L. Whittaker
ATTORNEY

United States Patent Office 3,076,106

Patented Jan. 29, 1963

3,076,106
INDUCTIVE CIRCUITS

Tjiske Douma, Haddonfield, N.J., assignor to Radio Corporatioin of America, a corporation of Delaware Filed Sept. 25, 1957, Ser. No. 686,199
5 Claims. (Cl. 307—106)

Figure 1:
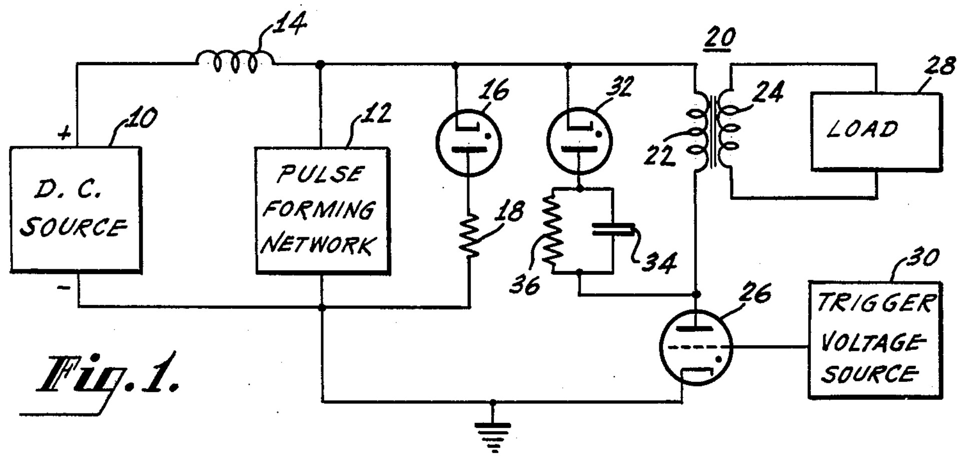

The present invention relates, in general, to inductive circuits and, more particularly, to pulse transformer circuits which are suitable for operation at high duty cycles.

When a pulse is applied to an inductive circuit such as a pulse transformer, magnetic energy is accumulated in the transformer. Upon the termination of the pulse, the energy acumulated in the transformer discharges. Since the period between pulses is normally much longer than the pulse interval, the transformer normally has sufficient time to discharge between pulses. The transformer discharge period is normally relatively long compared to the pulse interval but relatively short compared to the interpulse period.

It is important, in a circuit of the type described above, that the energy remaining in the pulse transformer be precisely the same at the beginning of each pulse. If it were not, the output pulses of the transformer might not be the same pulse-to-pulse. For example, if the magnetic energy accumulated in the transformer due to an applied current pulse were not entirely dissipated between pulses, successive pulses might cause the transformer to accumulate more and more energy. A point could be reached at which the transformer operated close to saturation, whereby there would be substantially less voltage amplification than the transformer turns ratio could ordinarily provide.

In high duty cycle applications, the situation described above becomes a problem. The periods between pulses are relatively short. The magnetic energy accumulated in the transformer during a pulse does not have sufficient time during the interpulse period completely to dissipate. Moreover, in circuits in which the pulse generator includes a gas tube for initiating the discharge of a storage device, such as a pulse forming network, through a transformer, the gas tube may not become extinguished between pulses. This is due, in part at least, to the fact that the anode of the tube is maintained sufficiently positive by the voltage developed at the pulse transformer, due to the continuing discharge of its magnetic energy, to maintain the gas ionized. The failure of the gas tube to stop conducting prevents the pulse forming network from accumulating charge the way it should between pulses and, in effect, destroys the usefulness of the pulse generating system.

An object of the present invention is to provide an improved circuit for dissipating, during the periods between pulses, the energy accumulated in an inductive load during the pulse periods.

Another object of the present invention is to provide, in a circuit of the type employing a gas tube as a switch between an inductive load and an energy source, an improved circuit for extinguishing the gas tube a predeterbined interval of time after it has fired.

Yet another object of the present invention is to provide an improved circuit for reversing the flux in a pulse transformer during the periods between pulses and thereby making more efficient use of the BH characteristics of the transformer. In other words, by reversing the flux in the transformer so that transformer operation extends to the extremes of the hysterists loop, a greater dynamic range is made possible for a given transformer design.

The circuit of the present invention includes an inductive load the voltage across which tends to reverse upon the termination of a current pulse applied thereto.

The inductive load may include a winding of a pulse transformer, for example. The current pulse may be applied to the transformer through a gas tube switch from a pulse forming network. A unidirectionally conducting element and a low impedance storage means are connected in series across the inductive load. The element is poled to conduct upon said voltage reversal, whereby upon such reversal, the magnetic energy in the transformer discharges into a low impedance, the transformer reverse voltage is maintained at a very low value, and the gas tube immediately deionizes. A dissipating load, such as a resistor, is connected across the storage means. The dissipating load has a value sufficiently small to permit dissipation of substantially the entire charge in the storage means during the period between pulses.

In another form of the invention, a unidirectionally conducting element and a storage means are connected in series across an inductive load, but the storage means is not shunted by a dissipating load. Instead, the unidirectionally conducting element is shunted by a switch such as a grid controlled hard tube. When the storage means charges to its maximum voltage, the unidirectionally conducting element stops conducting. The hard tube switch may then be closed. The hard tube is poled to conduct in a direction opposite to that of the unidirectionally conducting element, whereby when the hard tube is rendered conductive, the charge on the storage means discharges into the inductive load and in a sense to induce a flux therein in a direction opposite to the one which was previously induced by the application of a pulse.

A third form of the invention combines the features of the two forms of the invention described above. It will be described in greater detail later.

Figure 3:
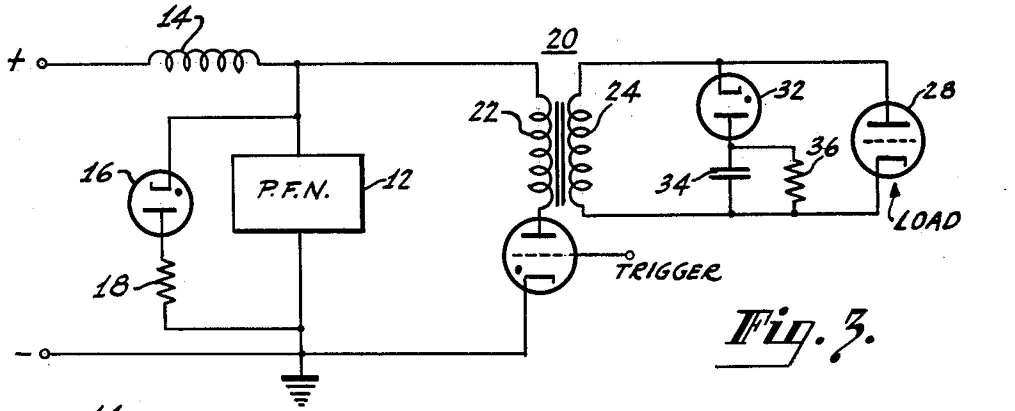
Figure 4:
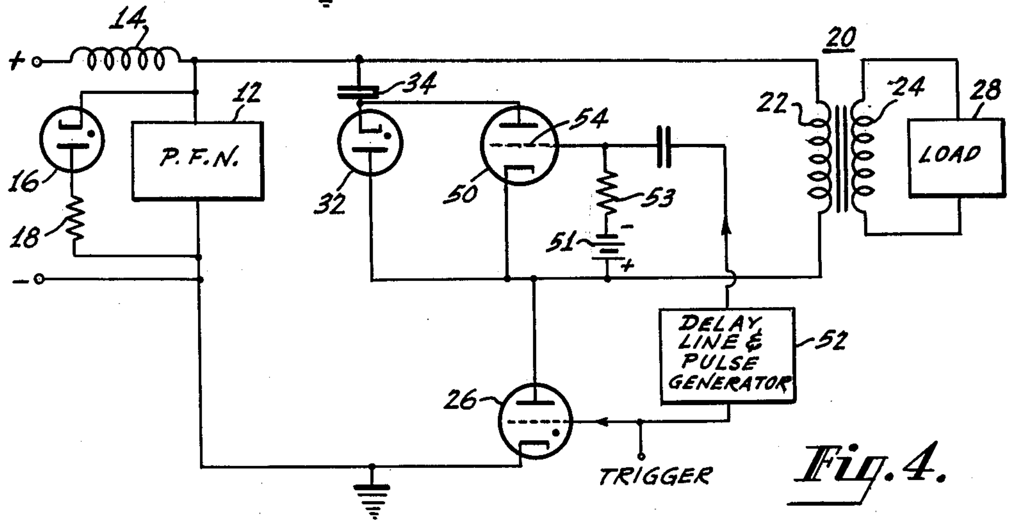
Figure 5A:
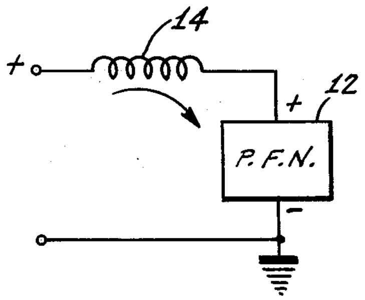
Figure 5B:
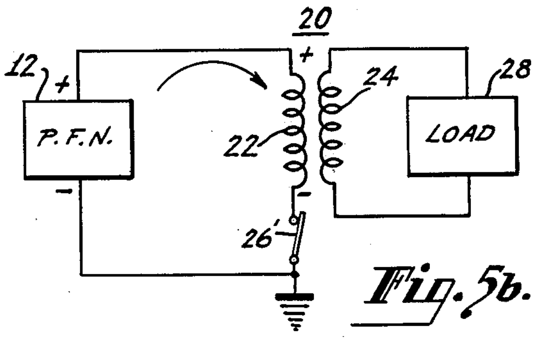
Figure 5C:
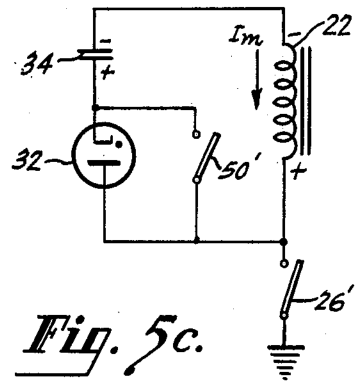
Figure 5D:
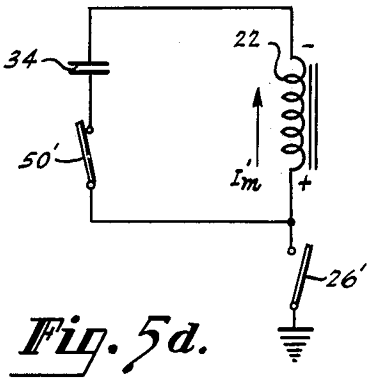
Figure 6:
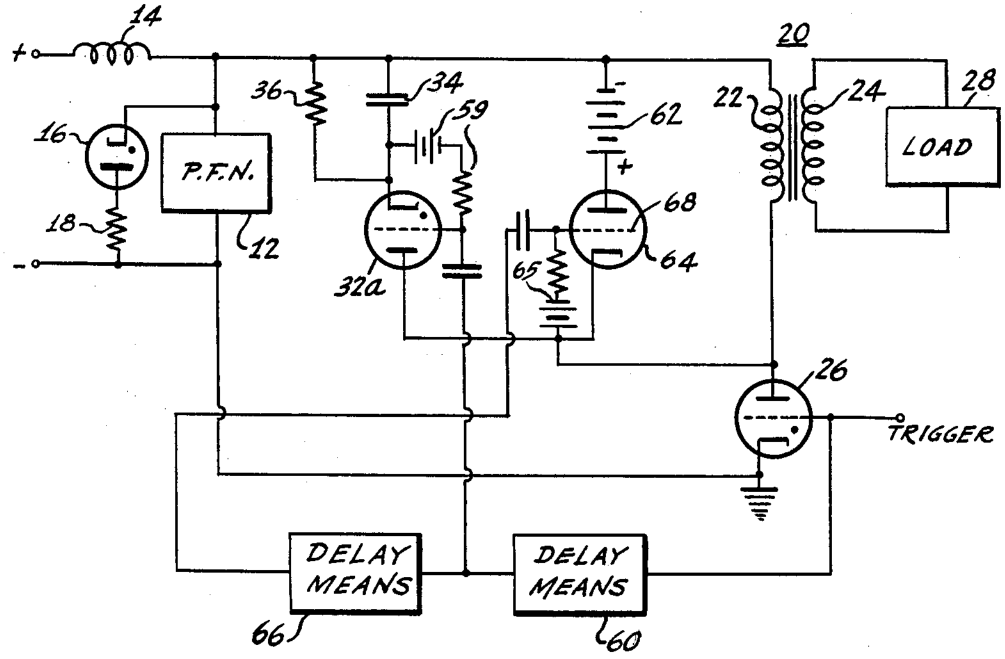

The invention will be described in greater detail by reference to the following description taken in connection with the accompanying drawing in which:

FIGURE 1 is a block and schematic circuit diagram of one form of the present invention;

FIGURES 2*a*–2*d* are equivalent circuits to explain how the circuit of FIGURE 1 operates;

FIGURES 3 and 4 are block and schematic circuit diagrams of other forms of the present invention;

FIGURES 5*a*–5*d* are equivalent circuits to explain how the circuit of FIGURE 4 operates; and FIGURE 6 is a block and schematic circuit diagram of an embodiment of the invention which includes means for dissipating the energy stored in an inductive load and means for reversing the flux in the inductive load.

Throughout the figures, similar reference numerals are applied to similar elements.

Referring to FIGURE 1, a direct voltage source 10 is connected across a pulse forming network 12 via a charging inductance 14. A diode 16, which may be gas filled or not, and a resistor 18 are connected across the pulse forming network. Their function, as in understood in the art, is to reduce to zero any negative voltage left on the pulse forming network after the termination of a pulse. A pulse transformer 20 having a primary winding 22 and a secondary winding 24 is connected to the pulse forming network 12 through a thyratron 26. The secondary winding 24 is connected to a load 28 such as a triode or other tube it is desired to pulse. Thyratron 26 is normally cut off and is triggered into conduction by a pulse applied from trigger voltage source 30.

According to the present invention, a unidirectionally conducting element, diode 32, and a charge storage means, condenser 34, are connected across the primary winding 22. The diode is preferably gas filled so that it has minimum impedance when conducting, however, it may be a vacuum tube, a semiconductor diode or similar unidirectionally conducting element. Condenser 34 is shunted by a dissipating load, shown here as resistor 36.

The operation of the circuit of FIGURE 1 can be best understood by referring to FIGURES 2*a*–2*d*.

Figure 2A:
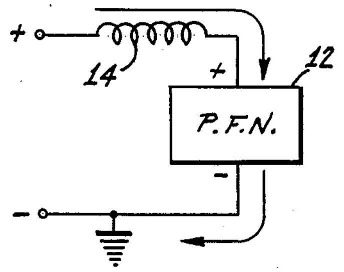

Referring to FIGURE 2*a*, during the period between pulses, pulse forming network 12 charges to the polarity indicated, via inductance 14. As the thyratron 26 is cut off, the primary winding 22 is effectively disconnected from the pulse forming network.

Figure 2B:
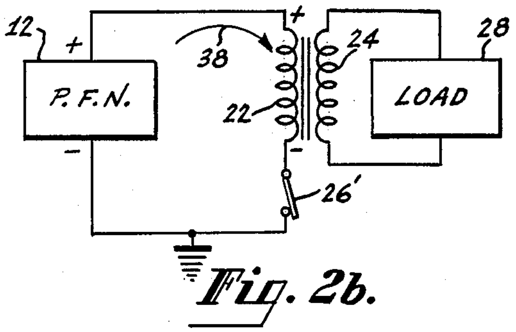
Figure 2C:
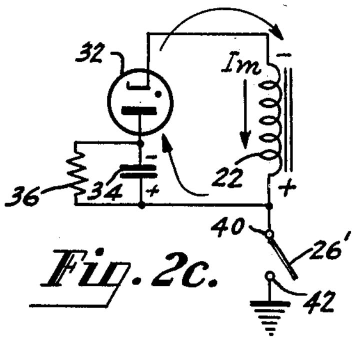

Referring to FIGURE 2*b*, a trigger pulse has been applied to the grid of the thyratron 26. It is therefore shown as a closed switch 26'. Pulse forming network 12 now discharges via primary winding 22, as indicated by arrow 38. Most of the energy stored in pulse forming network 12 is transferred to the load 28 but part of it is used to magnetize the pulse transformer. Preferably, the impedance of load 28 is slightly lower than that of the pulse forming network 12 in accordance with usual practice, however, this is not essential to the invention. After pulse forming network 12 has completely discharged, the magnetizing current $I_m$ in inductance 22 built up therein during the pulse, continues to flow in the same direction. However, the voltage reverses, as indicated in FIGURE 2*c*. The direction of the current in the primary winding 22 is such that it tends to maintain the gas in the thyratron ionized. Note, in this connection, that terminal 40 of switch 26' (FIGURE 2*c*) represents the anode of the thyratron and terminal 42 the cathode thereof. So long as the thyratron remains conducting, the pulse forming network does not recharge the way it should. This is one of the limiting factors in reducing the pulse repetition period.

According to the present invention, an auxiliary discharge path is provided for primary winding 22. Diode 32 is so poled that it begins to conduct immediately upon reversal of the voltage on the primary of the transformer. Capacitor 34 is of relatively large value. The series circuit of the diode and capacitor provides a low impedance path to the discharge of energy from the transformer. Therefore, immediately after termination of the main pulse, the reversed voltage across the primary 22 of the pulse transformer becomes substantially equal to the very small voltage drop across diode 32. This very low value of voltage at the thyratron anode causes the thyratron immediately to extinguish and to look like an open switch, as indicated in FIGURE 2*c*. As the condenser 34 charges, the voltage across the primary winding, which is equal to the sum of the voltage across the diode 32 and condenser 34, slowly rises.

When the magnetizing current $I_m$ in the primary winding reduces to zero, all of the magnetic energy in the transformer is discharged into the series circuit 32, 34. The direction of the current flow would then reverse if it could and condenser 34 would discharge back into the primary winding. However, the diode, which conducts in a single direction only, prevents this from happening.

Figure 2D:
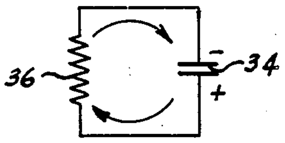

When the magnetic energy present in the primary winding 22 has been entirely converted into electric energy (the electric energy stored on condenser 34), and the diode has stopped conducting, the circuit, in equivalent form, becomes as indicated in FIGURE 2*d*. Condenser 34 now discharges through resistor 36. (Actually, this discharge starts as soon as diode 32 becomes conductive.) The time constant of the RC circuit is such that the entire condenser charge is substantially dissipated before a new cycle starts.

An advantage of using a low value of resistance is that the maximum voltage on condenser 34 will be lower. This means less k.v.a.'s in the condenser and smaller voltage transients on the pulse transformer when the diode stops conducting. It is desirable to choose the value of condenser 34 rather large (of the order of the total network capacity).

An important advantage of the circuit described is that the gas tube extinguishes immediately after the main pulse, thereby permitting the pulse forming network to begin recharging shortly thereafter. However, the time available for dissipating the magnetic energy accumulated in the transformer can be as long as the entire interpulse period. In other words, the magnetic energy is converted to a store charge almost immediately after the termination of the pulse, and the stored charge can discharge into resistance 36 during the entire remainder of the period between pulses.

The description above is largely qualitative and is believed to be sufficient to give a good understanding of the invention. However, a more mathematical and theoretical treatment of the circuit may be found in an article by the present applicant beginning at page 1052 in volume 12 of the Proceedings of the National Electronics Conference, published in April 1957, by the National Electronics Conference. The article also gives relative circuit component values.

The circuit of FIGURE 3 is the same as the one of FIGURE 1, except that the damping circuit of this invention is connected across the secondary winding of the transformer. Similar reference numerals have been applied to similar parts of the drawing and further explanation is believed not to be required.

The circuit of FIGURE 4 permits the flux in an inductive load to be reversed after the termination of a pulse applied to the load. The circuit differs from the ones of FIGURES 1 and 3 in that the storage condenser 34 is unshunted. Also, in the circuit of FIGURE 4, the diode 32 is shunted by a hard tube 50. The hard tube is cut off during the main pulse and made to conduct a predetermined interval of time after the main pulse is over. The biasing circuit is shown as a battery 51 and resistor 53 connected between the control grid and cathode of the hard tube. The same trigger source may be employed for both tubes, provided delay line and pulse generator 52 are interposed between the source and the control grid 54 of the hard tube. The pulse generator may be a blocking oscillator, multivibrator or the like and it produces a pulse of longer duration than the trigger pulse.

The operation of the circuit of FIGURE 4 may be understood by referring to FIGURES 5*a*–5*d*.

FIGURE 5*a* is similar to FIGURE 2*a*. The pulse forming network 12 charges through inductance 14 in the conventional manner. Similarly, when the thyratron is triggered, as indicated by closed switch 26' of FIGURE 5*b*, the pulse forming network discharges through primary winding 22. The voltage across the transformer is as indicated.

Upon the termination of the main pulse, the voltage across winding 22 reverses, and the magnetizing current in the primary starts to charge condenser 34 via diode 32. As long as diode 32 conducts, hard tube 50, indicated by open switch 50', will not conduct, whether cut off by negative grid bias or not, however, in the interest of circuit simplicity, tube 50 is preferably maintained beyond cut off except during the flux reversal period. As already mentioned in connection with FIGURE 2*c*, as soon as the primary winding 22 has discharged its entire energy, diode 32 stops conducting. Then condenser 34 is charged to its maximum voltage. In the embodiment of FIGURE 1, there is a resistor across condenser 34 for dissipating the condenser charge. However, in this embodiment, there is no shunt across the condenser and so the entire transformer energy remains stored in the condenser. The triode 50 may be made to conduct immediately after diode 32 stops conducting or, if desired, a predetermined time later. The time at which the conduction starts is, of course, determined by the time delay inserted by the delay means in block 52 (FIGURE 4).

The conduction of the triode is represented in FIGURE 5*d* by the closed switch 50'. The energy stored in condenser 34 now discharges into the primary winding 22 and in a sense to reverse the flux in this winding. Note, in this connection, the polarity of the voltage across the primary winding in FIGURES 5*b* and 5*d*. With proper choice of condenser 34, it can be arranged that the discharge current of condenser 34 is at its maximum when the next pulse arrives. At that moment, the voltage across primary winding 22 is zero and there is maximum flux reversal.

An important advantage of the circuit of FIGURE 4 is that it permits the most efficient utilization of a transformer. Since the flux is in a reverse condition at the start of a pulse, the greatest portion of the BH curve possible is utilized. Thus, it is possible to apply a much larger or longer input pulse to the transformer without driving the same to saturation than if the transformer had no flux present in the beginning of a pulse or had residual magnetization in the same sense as the magnetization caused by the pulse. Put another way, for a given pulse amplitude or width, it is possible to use a much smaller pulse transformer without running the risk that the pulse will drive the transformer to saturation. In the ideal case, there is no net loss of energy because when the tube 50 has negligible voltage drop, all the electric energy stored in condenser 34 is fed back into the transformer as magnetic energy but with the flux in opposite direction. In addition to these advantages, the circuit does the same job as the circuit of FIGURE 1 in that it causes the switch tube to extinguish immediately after the pulse.

The circuit of FIGURE 4 may equally well be connected to the secondary rather than the primary winding. This embodiment, which is similar to the one of FIGURE 3, is not illustrated.

The circuit of FIGURE 6 combines some advantages of the circuits of FIGURES 1 and 4. The circuit for dissipating the energy in the primary winding 22 is similar to the one of FIGURE 1 except that the diode 32 is replaced by a thyratron **32*a*. The thyratron is normally maintained non-conducting by biasing circuit 59 but is rendered conductive when the voltage across the primary winding 22 reverses. The delay means 60** may be a delay line.

A second circuit consisting of a D.C. source, shown as a battery 62, and a hard tube 64 is also connected across the primary winding 22. The hard tube 64 is normally cut off by biasing circuit 65. It is rendered conductive after the tube **32*a* has stopped conducting. One way this can be done is to place another delay means 66 between delay means 60 and the control grid 68 of triode 64. Delay means 66 may consist of a delay line in combination with a pulse generator for generating a pulse having a duration normally longer than that of the main pulse. The length of time triode 64 is rendered conductive depends upon the constants of the circuit (e.g., the voltage of the battery 62**) and the amount of flux reversal desired.

In operation, after a trigger is applied to thyratron 26, pulse forming network 12 discharges through primary winding 22 in series with the thyratron. The pulse forming network 12 is preferably slightly undermatched to load 28. At the end of the main pulse, the voltage across the transformer reverses. At this point, thyratron **32*a* is triggered and the energy in the primary winding discharges through thyratron 32*a* into condenser 34. The condenser 34, in turn, discharges into resistor 36. After the thyratron 32*a* has stopped conducting, triode 64 may be made conductive. The D.C. source 62 now applies current through triode 64 to the primary winding 22. As can be seen in the figure, the polarities of the source 62 and triode 64 are such that the flux in the primary winding 22** is reversed.

Triode 64 is maintained non-conductive during the main pulse and as long thereafter as thyratron **32*a* conducts. Thyratron 32*a* is maintained non-conductive during the time triode 64** conducts.

What is claimed is:

1. In combination, an inductive load; said inductive load comprising a pulse transformer having a primary and secondary and a load connected to said secondary; means for applying current pulses to said primary; a unidirectionally conducting element and a storage means connected in series across said inductive load, said element being poled to conduct upon voltage reversal across said load; and a dissipating load connected across said storage means, said dissipating load having a value sufficiently small to permit dissipation of substantially the entire charge in said storage means during the periods between pulses.

2. In combination, an inductive load; said inductive load comprising a pulse transformer having a primary and a secondary and a load connected to said secondary; means for applying current pulses to said primary; a unidirectionally conducting element and a storage means connected in series across said inductive load, said element being poled to conduct upon voltage reversal across said load; and a resistive load connected across said storage means, the time constant of said resistive load and storage means being sufficiently short to permit dissipation of substantially the entire charge in the storage means during the periods between pulses.

3. In combination, a pulse transformer having a primary and a secondary; a load connected to said secondary; means for applying current pulses to said primary; a unidirectionally conducting element and a storage means connected in series across said transformer, said element being poled to conduct upon voltage reversal across said primary; and a dissipating load connected across said storage means, said load having a value sufficiently small to permit dissipation of substantially the entire charge in said storage means during the periods between pulses.

4. In combination, an inductive load; said inductive load comprising a pulse transformer having a primary and a secondary and a load connected to said secondary; means for applying current pulses to said primary; a unidirectionally conducting element and a storage means connected in series across said inductive load, said element being poled to conduct upon voltage reversal across said load; and means connected to said storage means for dissipating substantially the entire charge in said storage means during the periods between pulses.

5. In combination, an inductive load; said inductive load comprising a pulse transformer having a primary and a secondary and a load connected to said secondary; means for applying current pulses to said primary; a unidirectionally conducting element and a charge storage element connected in series across said inductive load, said unidirectionally conducting element being poled to conduct upon voltage reversal across said load; and a shunting means connected across one of said elements for permitting discharge of said storage element when said unidirectionally conducting element has stopped conducting, said shunting means comprising a resistor connected across said charge storage element, the time constant of said charge storage element and resistor being sufficienty small to permit dissipation of substantially the entire charge in said charge storage element during the periods between pulses.

References Cited in the file of this patent

UNITED STATES PATENTS

| | | |
|---|---|---|
| 2,168,403 | Geiger | Aug. 8, 1939 |
| 2,363,822 | Wendt | Nov. 28, 1944 |
| 2,782,867 | Hall | Feb. 26, 1957 |